(12) United States Patent　(10) Patent No.: US 11,283,504 B2
Zu et al.　(45) Date of Patent: Mar. 22, 2022

(54) ADAPTIVE CSI RESOURCE ALLOCATION AND ADJUSTMENT BASED ON DIFFERENTIATED CHANNEL CONDITIONS

(71) Applicant: Huawei Technologies Co., Ltd., Shenzhen (CN)

(72) Inventors: Keke Zu, Shenzhen (CN); Marcus Kahn, Kista (SE); Hongliang Fu, Shanghai (CN); Zhongmin Deng, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 16/788,030

(22) Filed: Feb. 11, 2020

(65) Prior Publication Data

US 2020/0177259 A1　Jun. 4, 2020

Related U.S. Application Data

(63) Continuation of application No. PCT/EP2017/070436, filed on Aug. 11, 2017.

(51) Int. Cl.
*H04B 7/06*　(2006.01)
*H04B 7/08*　(2006.01)
*H04W 72/12*　(2009.01)

(52) U.S. Cl.
CPC ......... *H04B 7/0626* (2013.01); *H04B 7/0617* (2013.01); *H04B 7/0814* (2013.01); *H04W 72/1273* (2013.01)

(58) Field of Classification Search
None
See application file for complete search history.

(56) References Cited

U.S. PATENT DOCUMENTS

| 7,099,640 | B2 * | 8/2006 | Diao | H04B 1/7113 370/335 |
| 2016/0149679 | A1 * | 5/2016 | Frenne | H04L 5/005 370/329 |

(Continued)

FOREIGN PATENT DOCUMENTS

| CN | 102076097 B | 3/2014 |
| CN | 105406911 A | 3/2016 |

(Continued)

OTHER PUBLICATIONS

"DL CSI-RS design for NR CSI acquisition," 3GPP TSG RAN WG1 Meeting #87, Reno, USA, R1-1611241, XP051189813, pp. 1-7, 3rd Generation Partnership Project, Valbonne, France (Nov. 14-18, 2016).

(Continued)

*Primary Examiner* — Gregory B Sefcheck
*Assistant Examiner* — Suk Jin Kang
(74) *Attorney, Agent, or Firm* — Leydig, Voit & Mayer, Ltd.

(57) ABSTRACT

An apparatus and methods for efficiently allocating channel state information (CSI) resources in a wireless communication system are provided. The apparatus includes a processing node configured to receive one or more channel features, wherein the one or more channel features are associated with a radio channel corresponding to a radio link connecting an access node and a user equipment. The processing node is configured to determine one or more distinguishing channel conditions based on the received one or more channel features, determine a desired channel state information (CSI) resource configuration based on the one or more distinguishing channel conditions, and allocate the desired CSI resource configuration based on the desired CSI resource configuration, and adjust a current CSI resource (Continued)

configuration associated with the radio channel, based on the determined desired CSI resource configuration.

18 Claims, 10 Drawing Sheets

(56) References Cited

U.S. PATENT DOCUMENTS

| | | | |
|---|---|---|---|
| 2017/0302480 A1* | 10/2017 | Kim | H04B 7/0478 |
| 2017/0311311 A1* | 10/2017 | Frenne | H04L 5/0048 |
| 2018/0091272 A1* | 3/2018 | Wang | H04B 7/0626 |
| 2019/0045386 A1* | 2/2019 | Frenne | H04B 7/0647 |
| 2019/0089436 A1* | 3/2019 | Wei | H04L 5/0082 |
| 2019/0222279 A1* | 7/2019 | Xi | H04B 7/0491 |
| 2019/0312623 A1* | 10/2019 | Park | H04B 7/0617 |
| 2019/0387520 A1* | 12/2019 | Ghosh | H04L 1/004 |
| 2020/0015109 A1* | 1/2020 | Frenne | H04L 5/0048 |
| 2020/0084787 A1* | 3/2020 | Hao | H04W 72/044 |
| 2020/0233334 A1* | 7/2020 | Frenne | H04W 16/14 |
| 2021/0083743 A1* | 3/2021 | Faxer | H04B 7/0639 |
| 2021/0136610 A1* | 5/2021 | Muruganathan | H04W 24/10 |
| 2021/0143870 A1* | 5/2021 | Faxer | H04B 7/0697 |

FOREIGN PATENT DOCUMENTS

| | | |
|---|---|---|
| CN | 107005299 A | 8/2017 |
| EP | 2418782 A1 | 2/2012 |
| WO | 2009055167 A2 | 4/2009 |
| WO | 2016048089 A1 | 3/2016 |

OTHER PUBLICATIONS

"Discussion on CSI Framework Design," 3GPP TSG RAN WG1, Meeting #89, Hangzhou, China, R1-1706926 XP051272156, pp. 1-9, 3rd Generation Partnership Project, Valbonne, France (May 15-19, 2017).

Va et al., "The Impact of Beamwidth on Temporal Channel Variation in Vehicular Channels and its Implications," pp. 1-15, Institute of Electrical and Electronics Engineers, New York, New York (Nov. 2016).

"3rd Generation Partnership Project; Technical Specification Group Radio Access Network; Study on 3D channel model for LTE (Release 12)," 3GPP TR 36.873 V12.3.0, pp. 1-42, 3rd Generation Partnership Project, Valbonne, France (Dec. 2016).

* cited by examiner

ADAPTIVE CSI RESOURCE ALLOCATION AND ADJUSTMENT BASED ON DIFFERENTIATED CHANNEL CONDITIONS

CROSS-REFERENCE TO RELATED APPLICATIONS

This application is a continuation of International Application No. PCT/EP2017/070436, filed on Aug. 11, 2017, the disclosure of which is hereby incorporated by reference in its entirety.

TECHNICAL FIELD

Embodiments of the present disclosure relate generally to mobile communications systems and more particularly to radio resource usage.

BACKGROUND

Scheduling strategies used in modern wireless communication systems rely on information about channel conditions to efficiently schedule radio resources. An access node, such as a base station, may obtain channel state information (CSI) from CSI reports and/or sounding reference signals (SRS) transmitted by user equipment (UE). CSI allows access nodes to adapt transmission strategies based on current conditions of each radio channel. Adaptation is crucial for achieving reliable communication with high data rates in multi-antenna wireless communication systems.

In frequency division duplex (FDD) systems, such as long term evolution (LTE) cellular systems, CSI is often provided by CSI reports transmitted by a UE and received by the access node. In time division duplex (TDD) systems, CSI is often estimated from SRS transmitted by a UE. Transmission of CSI, CSI reports and/or SRS, may be periodic or aperiodic.

Fast changing channels require more frequent CSI transmissions, while slow changing channels can achieve reliable communication with less frequent CSI transmissions. Because radio resources used for CSI are not available for data transmission, there is a tradeoff between having accurate up to date CSI and data transmission rates. Conventional wireless systems often fix or limit the amount of radio resources used for CSI and do not effectively adapt the CSI resource configurations based on current channel conditions resulting in unnecessarily limiting the number of UE that may be served by an access node, lower data rates, or both. Thus there is a need for improved apparatus and methods for effectively adapting CSI resource configurations based on conditions of the radio channel.

SUMMARY

It is an object of the disclosed embodiments to provide improved apparatus and methods for efficiently allocating channel state information (CSI) resources in a wireless communication system. Fixed and non-adaptive approaches to CSI resource allocation result in inefficient and wasteful CSI resource usage that can limit data rates and reduce the number of devices an access node can service. This problem is solved by the approaches to adaptive CSI resource allocation and system parameter adjustment disclosed herein.

According to a first aspect of the disclosed embodiments the above and further objects and advantages are obtained by a processing node coupled to a wireless communications network. The processing node is configured to receive one or more channel features, wherein the one or more channel features are associated with a radio channel corresponding to a radio link connecting an access node and a user equipment. The processing node is configured to determine one or more distinguishing channel conditions based on the received one or more channel features, determine a desired channel state information (CSI) resource configuration based on the one or more distinguishing channel conditions, allocate the desired CSI resource configuration based on the desired CSI resource configuration, and adjust a current CSI resource configuration associated with the radio channel based on the determined desired CSI resource configuration. Adaptive allocation of CSI resources allows for improved efficiency of resource usage, improved communication, and larger numbers of UE to be served.

In a possible implementation form of the processing node according to the first aspect the processing node is further configured to actively adjust a system setting based on one or more of the one or more channel features; the one or more distinguishing channel conditions; the desired CSI resource configuration; a desired channel condition; and an available CSI resource pool. Active adjustment of system settings allows an access node to predictably modify the channel conditions of the served UE so CSI resources can be re-allocated in a desired way.

In a further possible implementation form of the processing node according to the first aspect as such, or according to any one of the previous possible implementation forms, the processing node is configured to determine a differentiated channel condition approximation based on the one or more channel features and the one or more differentiating channel conditions, and to determine the desired CSI resource configuration based on a mapping of the one or more differentiating channel condition approximations to the desired CSI resource configuration. Use of a mapping to determine the desired CSI resource configuration allows numerical approaches, including heuristics and learning algorithms, to be implemented, which can improve selection of the desired CSI resource configuration.

In a further possible implementation form of the processing node according to the first aspect as such or according to any one of the previous possible implementation forms the processing node is configured to determine a desired CSI resource configuration by selecting a differentiated coherence time model from a plurality of differentiated coherence time models, wherein the plurality of differentiated coherence time models comprise one or more of a Clarke's model, an LOS model, a NLOS small pointing error model, and a NLOS large pointing error model. The processing node is configured to compute a differentiated coherence time approximation based on the selected differentiated coherence time model, and determine the desired CSI resource configuration based on the determined differentiated coherence time approximation. This provides a more accurate approximation of coherence time leading to better channel differentiation and CSI resource allocation.

In a further possible implementation form of processing node according to first aspect as such or the previous possible implementation form the processing node is configured to select, when the radio channel is determined to be in a LOS condition, the LOS model as the differentiated coherence time model. This provides improved coherence time approximation for LOS channels.

In a further possible implementation form of processing node according to first aspect as such or a previous possible implementation form the processing node is configured to select, when the radio channel is determined to be in a dominant NLOS condition with small pointing error, the NLOS small pointing error model as the differentiated coherence time model. This provides improved coherence time approximation for NLOS channels having small pointing error.

In a further possible implementation form of processing node according to first aspect as such or a previous possible implementation form the processing node is configured to select, when the radio channel is determined to be in a dominant NLOS condition with large pointing error, the NLOS large pointing error model (eq. 4) as the differentiated coherence time model. This provides improved coherence time approximation for NLOS channels having large pointing error.

In a further possible implementation form of processing node according to first aspect as such or a previous possible implementation form the processing node is configured to select the differentiated coherence time model as a statistical data based model, and to compute the differentiated coherence time approximation based on the statistical data based model. Statistical data based models provide improved flexibility broader applicability of coherence time approximations.

In a further possible implementation form of the processing node according to the first aspect as such or the previous possible implementation form the processing node is configured to update the statistical data based model based on historical data. Updating the statistical model allows the algorithms to compensate for and/or to track changes in the wireless communication system.

In a further possible implementation form of the processing node according to the first aspect as such or according to any one of the previous possible implementation forms, the desired CSI resource configuration comprises one or more of a desired CSI period, a desired number of resource blocks, a desired position of resource blocks, a desired type of combs, and a desired phase rotation, and the current CSI resource configuration comprises a corresponding one or more of a current CSI period, a current number of resource blocks, a current position of resource blocks, a current type of combs, and a current phase rotation. The processing node is configured to adjust the current CSI resource configuration when a difference between the desired CSI resource configuration and the current CSI resource configuration exceeds a threshold value. Use of multiple CSI resource types improves allocation efficiency and use of a threshold provides a simple and effective way to trigger adjustment of the CSI resource configurations.

In a further possible implementation form of the processing node according to the first aspect as such or according to any one of the previous possible implementation forms, the one or more distinguishing channel conditions comprise a plurality of distinguishing channel conditions, the plurality of distinguishing channel conditions being associated with a plurality of radio channels, and wherein each radio channel in the plurality of radio channels corresponds to a radio link connecting the access node to one user equipment in a plurality of user equipment. The processing node is configured to select for each radio channel in the plurality of radio channels a differentiated coherence time model from the plurality of coherence time models based on the distinguishing channel conditions associated with the each radio channel to determine a differentiated coherence time approximation for each radio channel in the plurality of radio channels based on the corresponding selected coherence time model and the associated distinguishing channel conditions, to determine for each radio channel in the plurality of radio channels a desired CSI configuration based on the determined differentiated coherence time approximations and/or a current CSI allocation, and to adjust one or more current CSI resource configurations based on the corresponding determined desired CSI resource allocation. Each radio channel in the plurality of radio channels is associated with one of the one or more current CSI resource configurations. Taking all served UE into consideration when allocating resources and/or adjusting system settings leads to better efficiencies and improves overall performance of the wireless communication system.

In an further possible implementation form of the processing node according to the first aspect as such or the previous possible implementation form of the first aspect the wireless communications network comprises a set of available CSI resource configurations. When the wireless communications network comprises sufficient CSI resources to satisfy all the desired CSI resource configurations, the processing node is configured to assign, for each radio channel in the plurality of radio channels, a new CSI resource configuration from the set of available CSI resource configurations. When the wireless communications network comprises insufficient CSI resources to satisfy all the desired CSI resource configurations, the processing node is configured to recover extra CSI resources by reducing an amount of CSI resources being used by radio channels having more CSI resources than required by the corresponding desired CSI resource configuration, and assign the recovered extra CSI resources to radio channels having fewer CSI resources than required by the corresponding desired CSI resource configuration. Shifting resources between UE in a resource starved network allows more UE to be served with improved throughput.

In a further possible implementation form of the processing node according to the first aspect as such or according to any one of the previous possible implementation form of the first aspect the system settings include one or more of a carrier frequency, a beam width, a beam phase, a beam pointing direction, and a transmit power. These system settings provide improved differentiation among UE to be achieved when adjusting the system settings.

In a further possible implementation form of the processing node according to the first aspect as such or according to any one of the previous possible implementation forms of the first aspect the processing node is configured to select the threshold value from a set of one or more predetermined threshold values based on an overall system throughput. Use of a predetermined set of threshold values allows system performance to be adjusted in various ways depending on changing criteria.

In a further possible implementation form of the processing node according to the first aspect as such or according to any one of the previous possible implementation forms of the first aspect the processing node is configured to adjust the threshold value based on the available CSI resources, and/or historical values of a computed differentiated coherence time approximation. Adjusting the threshold based current and past system information allows the network to adapt to changing conditions.

In a further possible implementation form of the processing node according to the first aspect as such or according to any one of the previous possible implementation forms of the first aspect the current CSI resource configuration includes one or more of a CSI reporting period, a sounding reference signal period, a number and positions of resource block allocation, type of comb, phase rotation, cyclic shifts, and code multiplexing, and wherein the processing node is configured to adjust the current CSI resource configuration based on the desired CSI resource configuration. Use of various CSI resource configuration values provides greater efficiencies during allocation of the available CSI resources.

In a further possible implementation form of the processing node according to the first aspect as such or according to any one of the previous possible implementation forms of the first aspect the one or more channel features include one or more of carrier frequency, beam width, beam phase, AOA/DOA, CDI, angular rotation, linear mobility, pointing error, path loss, user equipment position, and the processing node is configured to determine the desired CSI resource configuration based on the one or more channel features. This group of channel features supports a wide variety of effective adaptation algorithms.

According to a second aspect of the disclosed embodiments the above and further objects and advantages are obtained by a method that includes receiving one or more channel features, wherein the one or more channel features are associated with a radio channel corresponding to a radio link connecting an access node and a user equipment, determining one or more distinguishing channel conditions based on the received one or more channel features, determining a desired CSI resource configuration based on the distinguishing channel conditions, and adjusting a current CSI resource configuration associated with the radio channel, based on the determined desired CSI resource configuration. Adaptive allocation of CSI resources allows for improved efficiency of resource usage, improved communication, and larger numbers of UE to be served.

In a possible implementation form of the method according to the second aspect, the method includes adjusting system settings based on the desired CSI resource configuration and/or a desired channel conditions, wherein the system settings comprise one or more of a carrier frequency, a beam width, a beam phase, a beam pointing direction, and a transmit power. Active adjustment of system settings allows an access node to predictably modify the channel conditions of the served UE so CSI resources can be re-allocated in a desired way.

According to a third aspect of the disclosed embodiments the above and further objects and advantages are obtained by a computer program product that includes non-transitory computer program instructions that when executed by a processor are configured to cause the processor to perform the method according to the second aspect as such or according to the first possible implementation form of the second aspect. Adaptive allocation of CSI resources allows for improved efficiency of resource usage, improved communication, and larger numbers of UE to be served.

BRIEF DESCRIPTION OF THE DRAWINGS

In the following detailed portion of the present disclosure, the aspects of the disclosed embodiments will be explained in more detail with reference to the example embodiments shown in the drawings, in which.

DETAILED DESCRIPTION OF THE DISCLOSED EMBODIMENTS

Figure 1:
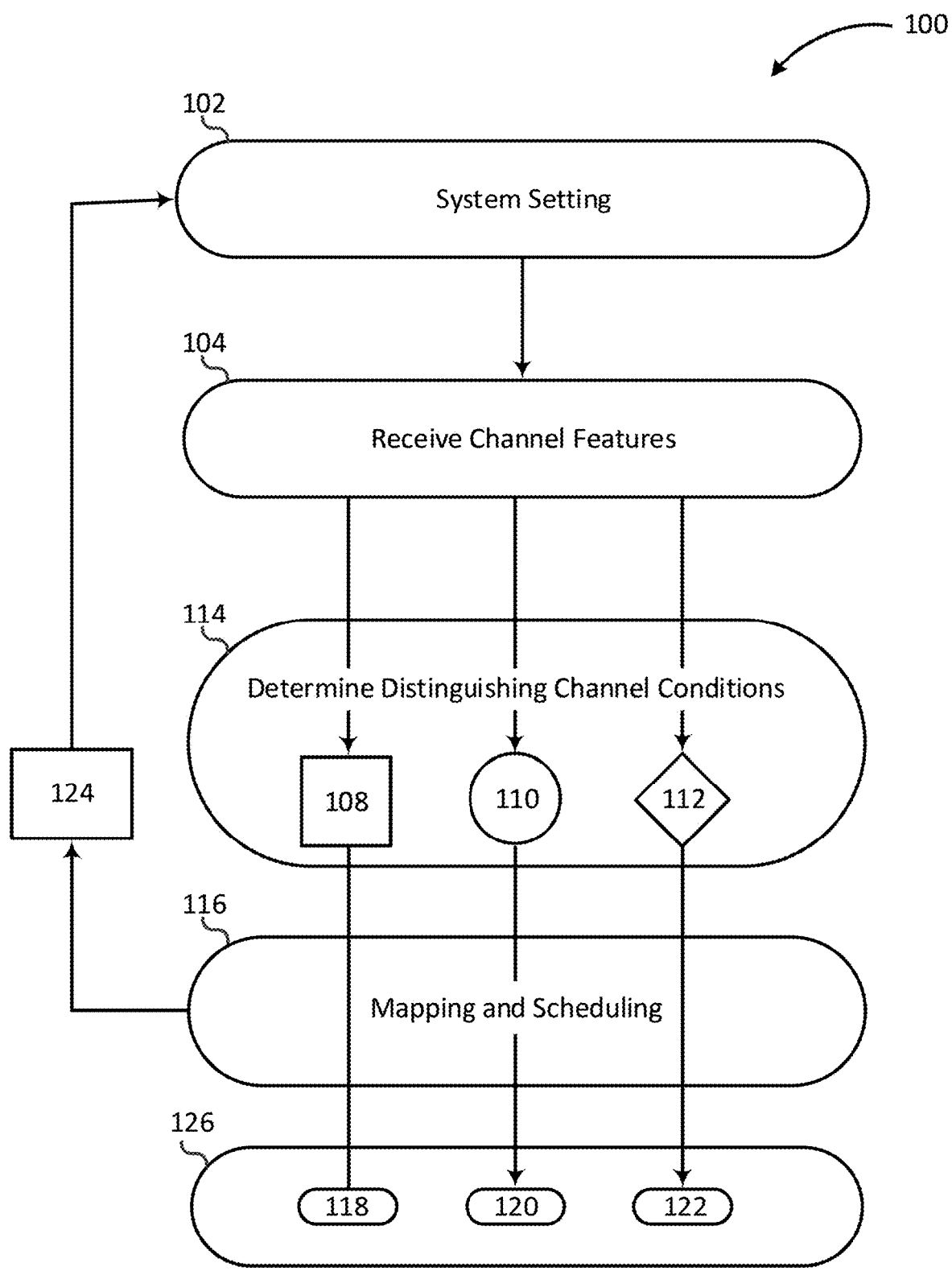
FIG. 1 illustrates a flow diagram of an exemplary process for updating channel state information resource configurations incorporating aspects of the disclosed embodiments.

FIG. 1 illustrates a flow diagram showing an exemplary embodiment for updating channel state information (CSI) resource configurations based on differentiated channel condition approximations (DCCA). An initial set of system settings 102 are used to establish a radio link between an access node and one or more user equipment (UE) being served by the access node (AN). The term "radio link" as used herein generally refers to a two way radio frequency communication link between two transceivers or transmitter-receivers over which information may be exchanged. For example a radio link is formed between an access node and a user equipment when the user equipment connects to the access node and begins exchanging information. The terms "channel" and "radio channel" are used herein to refer to the path or paths traveled by radio signals sent and/or received over a radio link. "System settings" or "setting" refers to values that may be configured in a transmitter or receiver that are associated with the physical layer of a radio link. System settings may include various physical layer values such as carrier frequency, beam width, beam phase, beam pointing direction, transmit power, etc.

Figure 9:
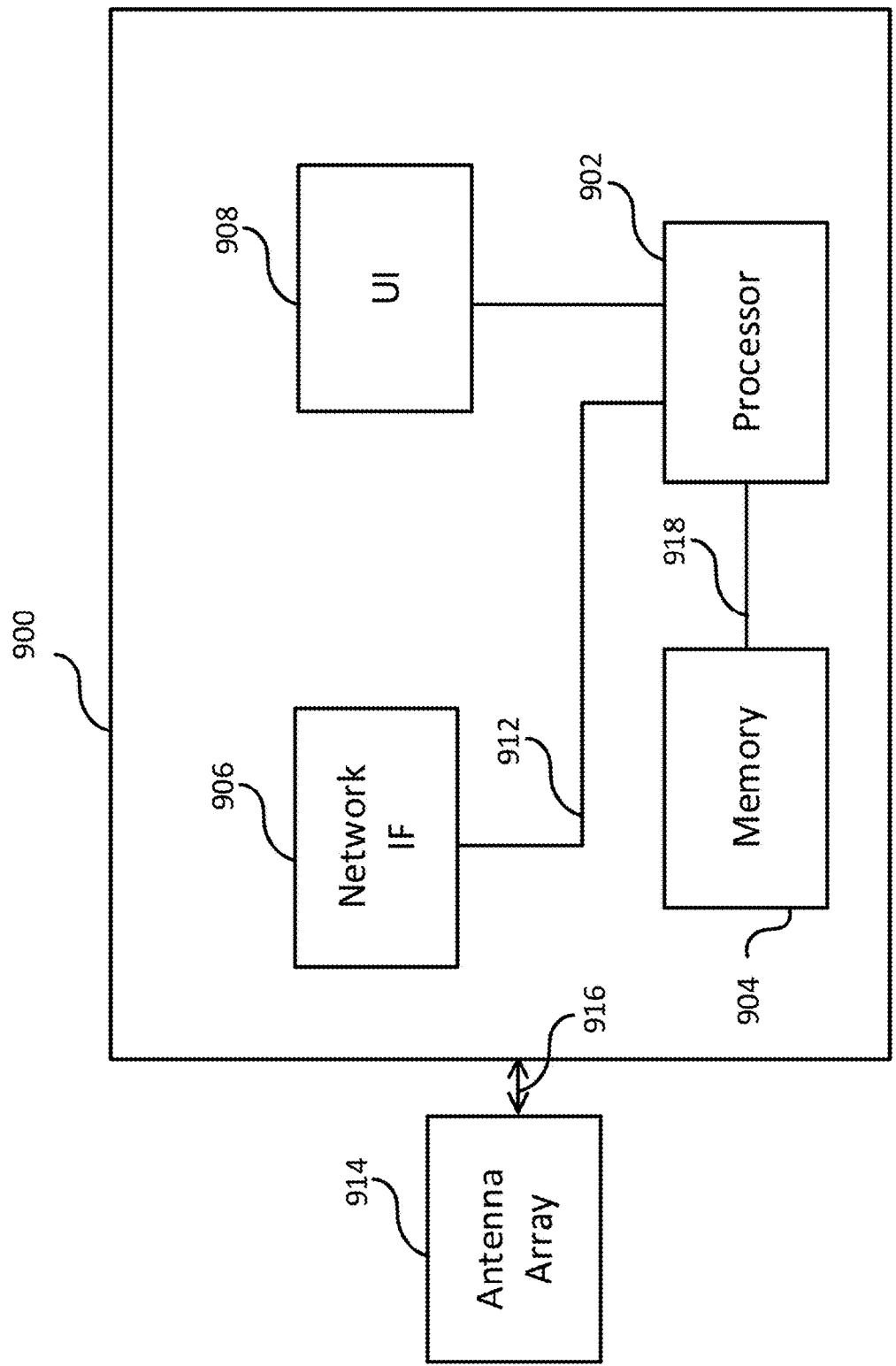
FIG. 9 illustrates a pictorial diagram of a wireless communication system incorporating aspects of the present disclosure.
Figure 10:
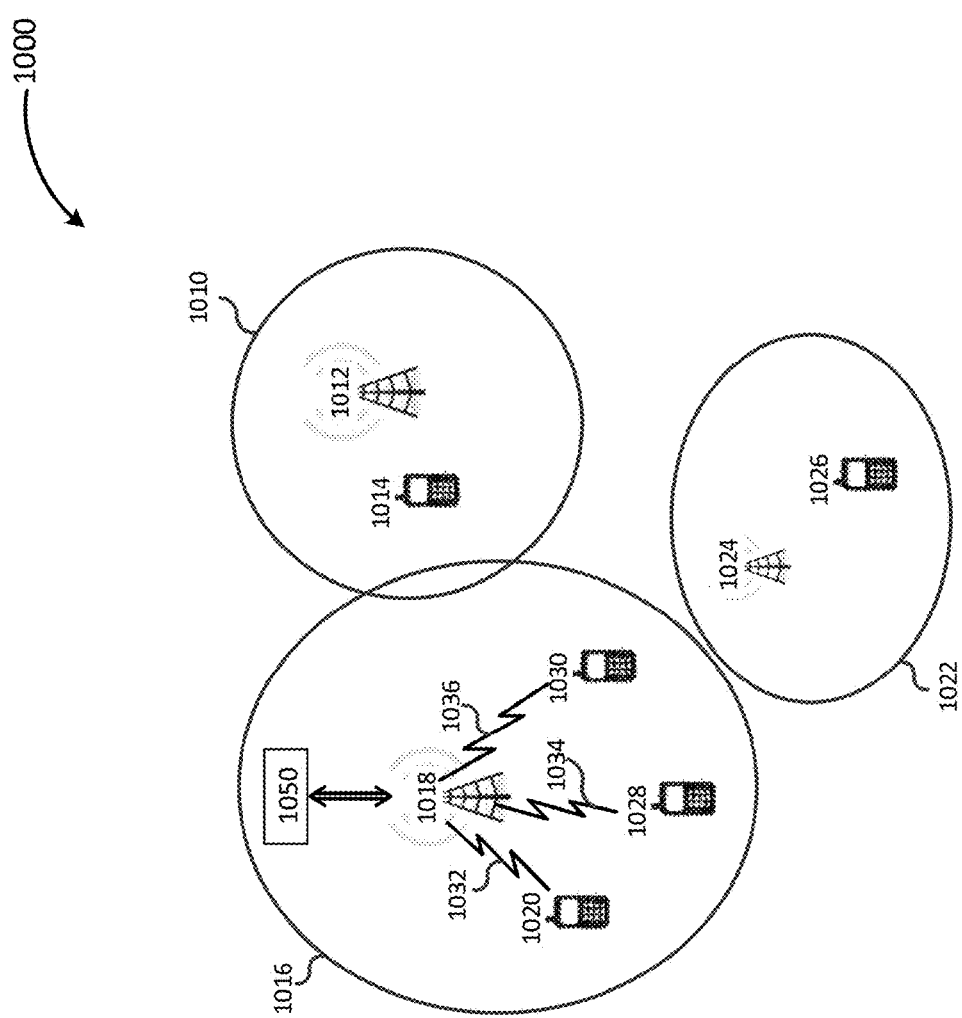
FIG. 10 illustrates a block diagram of an exemplary processing node incorporating aspects of the disclosed embodiments.

In one embodiment, referring also to FIGS. 9 and 10, channel features are received 104 by a processing node 900 for some or all of the radio channels corresponding to a radio link or channel 1032 connecting an access node 1018 and the one or more UE 1020 being served by the access node 1018. Channel features provide information useful for adapting CSI resource configurations and system settings and may be used to improve overall radio resource usage. Additional channel features may be derived from the received channel features as desired.

Channel features may be detected and/or otherwise recognized and include information useful for describing the radio channels within a radio link. Certain channel features may be obtained directly from the system configuration such as the system settings described above. Other channel features may be detected from measurements. For example beam pointing direction can be directly obtained from the measured channel direction indicator (CDI). Mobility can be obtained from the time difference of arrival (TDOA) or fingerprint positioning, for example. Additional channel features can be inferred or derived from other features or measurements. For example, the pointing error can be inferred from mobility features where a UE with high mobility may have a high pointing error, while a UE with low mobility may have a small pointing error. Other channel features may be determined based on historical values through the use of various modeling techniques such as statistical modeling or heuristic modeling. For example the velocity of a UE can be estimated through analysis of past UE position or location measurements.

Channel features are used to determine 114 distinguishing channel conditions (DCC) that may be used to identify differences among the various radio channels being used to service UE. Differences among the radio channels can be exploited by an access node, such as access node 1018 to improve how CSI resources are allocated and scheduled to each UE 1020 being served. Channel conditions used to distinguish the radio channels may include conditions such as line of sight (LOS), non-line of sight (NLOS) with strong reflections or dominant paths, pointing error, NLOS without dominant paths (or can be termed as Rayleigh condition).

In certain embodiments, it may be advantageous to determine differentiated channel condition approximations (DCCA) 108, 110, 112 for each radio channel based on the associated DCC and received channel features. When DCCA determination is used a DCCA 108, 110, 112 may be determined for each radio channel between a UE and the serving access node, where the DCCA 108, 110, 112 provides information useful for allocation and scheduling of CSI resources. The DCCA 108, 110, 112 may be any appropriate value or modeling technique suitable for determining an amount of CSI resources to be allocated to each radio channel. As will be discussed further below, one example of an appropriate DCCA is a differentiated coherence time approximation (DCTA). The DCCA 108, 110, 112 associated with each UE may be determined based on different modeling or approximation techniques using any of the channel features, DCA, or other information known about the radio channels or UE. This differentiation between the radio channels allows different CSI resource configurations to be allocated to different radio channels. For example a slowly varying radio channel with a long coherence time requires fewer CSI reports than a rapidly varying radio channel with a relatively short coherence time.

Based on the system scheduling criteria, the DCCA, which in certain embodiments may be a DCTA, are mapped to differentiated scheduling periods or more generally to a desired CSI resource configuration for each radio channel. Available radio resources are mapped and scheduled 116 base on system scheduling criteria, the determined DCCA 108, 110, 112, the received channel features, and/or the DCC. Mapping and scheduling 116 is guided by both system scheduling criteria as well as the DCCA 108, 110, 112 to determine or allocate 126 a desired CSI resource configuration 118, 120, 122 for each radio channel. The differentiation among radio channels indicated by the DCCA 108, 110, 112 determination 114 allows algorithms for mapping and scheduling to more efficiently and intelligently adjust 126 CSI resource configurations 118, 120, 122 to maximize radio resource usage. For example, CSI resources used by a stable or slowly varying radio channel may be reduced, and the recovered CSI resources may then be allocated to a less stable or faster varying radio channel.

Alternatively, in certain embodiments, desired CSI resource configurations may be determined 126 based on historical values of DCC and channel features. Statistical and/or heuristic modeling techniques may be applied to the DCC and/or channel features and configured for selection of, or determination 126 of a desired CSI resource configuration. The statistical/heuristic model can also be updated as new information is obtained about the radio channels.

In certain embodiments, system settings may be adjusted 124 to further differentiate the radio channels and improve effectiveness of CSI resource configuration determination 126. Determination 126 of DCCA 108, 110, 112 along with information obtained during mapping and scheduling 116, such as the desired CSI resource configurations, may be used to adjust 124 the system settings in a way that allows reduction of CSI resources allocated to some radio channels thereby freeing up CSI resources that may then be used by other radio channels.

Modern wireless communication systems are beginning to implement techniques such as beamforming that provide for significant differentiation of channel conditions among the radio channels being served by an access node. Further it is possible in these new systems to predictably influence channel conditions through modification of the system settings allowing active control of differentiation among the radio channels.

Any appropriate metric may be used as the DCCA such as for example, differentiated coherence time approximation (DCTA) and differentiated angular spread (DCAS). Coherence time is an interval of time over which the impulse response of a radio channel remains substantially unchanged or unvarying. The angular spread (AS) is an angular range within which about 95 percent of the channel energy is concentrated. For a LOS channel the AS is usually below about 2 degrees. For a NLOS channel with a dominate path, the AS is usually no more than about 20 degrees and about 95 percent of the channel energy is concentrated on half of the direction of arrival (DoA) for that channel. For a NLOS channel that does not have a dominant path, the AS is larger than 20 degrees and there is substantially no sparsity in terms of the DoA. This variation of AS among different radio channels allows the AS to be used to differentiate the radio channels making it an appropriate value for use as a DCCA.

As an aide to understanding it is instructive to illustrate portions of the above embodiments with examples based on coherence times. Coherence time provides a measure of channel stability and can be used when allocating CSI resources to the radio channels servicing the UE. Radio channels with relatively short coherence times require more frequent CSI updates than radio channels with longer coherence times.

Conventional wireless systems approximate coherence times using Clarke's model as shown by equation 1:

$$T_c = \sqrt{\frac{9}{16\pi} \frac{1}{f_d}} \cong \frac{0.423}{f_d} \qquad \text{eq. 1}$$

where $f_d$ is the maximum Doppler frequency shift associated with the radio channel. Coherence time approximations derived using Clarke's model, eq. 1, hereinafter referred to as Clarke's coherence time, provide an approximation of coherence time related only to UE speed. The faster a UE moves, the faster the radio channel changes and the smaller the coherence time becomes. Thus coherence time approximations in conventional wireless systems, such as Long Term Evolution (LIE) based wireless communication systems, are related only to UE speed.

Coherence time approximations may also be determined using channel quality indicator (CQI) values which in certain embodiments may be a simple index value. CQI values may be based on channel measurements such as signal to noise ratio (SNR) information and are also sometimes used to select transmission schemes such as modulation and coding schemes (MCS).

Clarke's coherence time may be used as a trigger for scheduling data packets, or it may be used for calculating the delay associated with a data packet. To accomplish this, the UE being served by an access node are categorized into different speed levels. All UE belonging to the same speed level are assigned one scheduling update period and the UE belonging to a different speed level are assigned a different scheduling update period. With this approach, Clarke's coherence time is calculated for each UE. When the Clarke's coherence time value is greater than the scheduling update period, the corresponding UE are allocated a higher scheduling priority.

Clarke's coherence time model, eq. 1, assumes that incoming signals arrive uniformly over the full 360 degree angular range. This assumption usually holds under rich scattering environments with omnidirectional reception and low frequency carriers, such as below 2.6 GHz as used in some older 2G/3G/4G type wireless systems. However, it is expected that next generation wireless systems will be configured with a large number of antennas and/or higher frequencies, such as for example 3.5 GHz, 5 GHz, 10 GHz, 15 GHz. It is also likely that beamforming will be implemented to take advantage of benefits provided by large antennas and/or for overcoming drawbacks of higher frequencies such as path loss. Therefore, beam-centric wireless systems, such as massive multi-input multi-output (Ma-MIMO) systems, will have much more variation or differentiation among the radio channels than conventional wireless systems.

Figure 2:
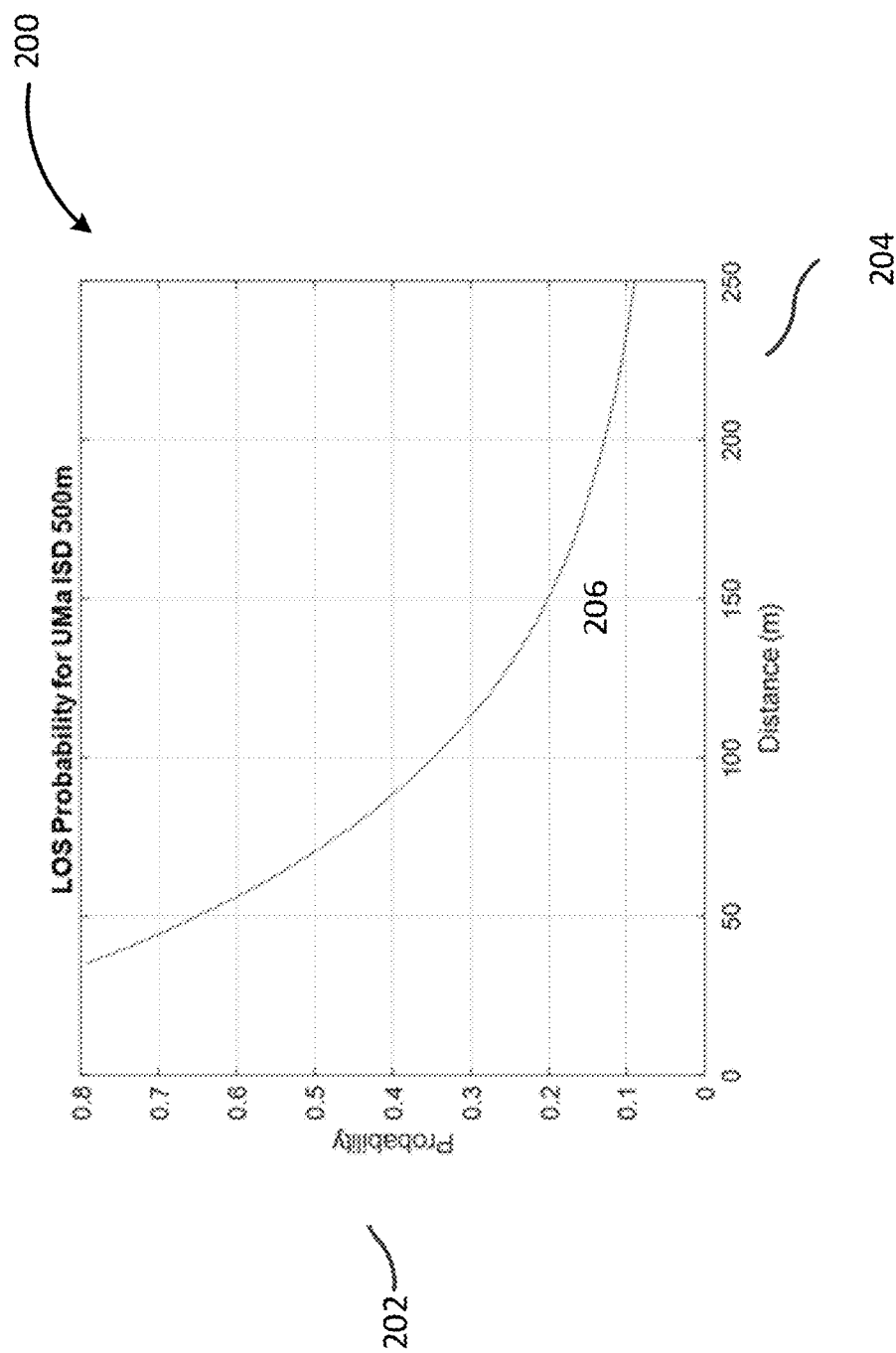
FIG. 2 illustrates a graph of line-of-sight probability in an urban macro environment incorporating aspects of the disclosed embodiments.
Figure 3:
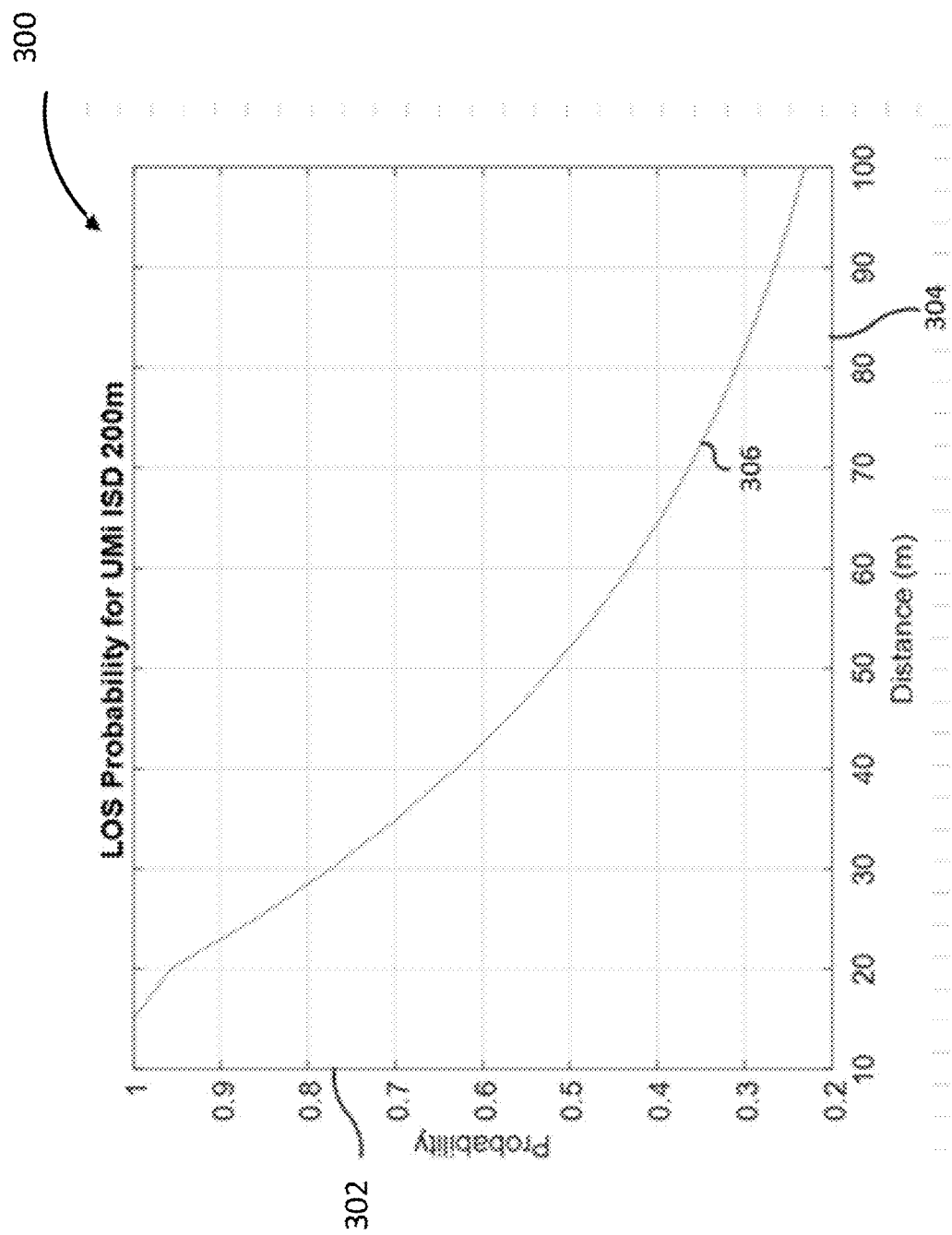
FIG. 3 illustrates a graphs of line-of-sight probability in an urban micro environment incorporating aspects of the disclosed embodiments.

FIG. 2 illustrates a graph 200 showing the line of sight (LOS) probability 206 (i.e. the probability that a radio link connecting a UE to an access node will be a LOS radio link) for an Urban Macro use case with inter site distance (ISD) of 500 meters. FIG. 3 illustrates a graph 300 showing the LOS probability 306 for an Urban Micro use case with an inter-site distance of 200 meters. In graphs 200 and 300 the inter-site distance is shown in meters along the horizontal axis 204, 304 and the probability is shown along the vertical axis 202, 302. Table 1 shows the system parameters used for the Urban Macro (UMa) and the Urban Micro (UMi) use cases illustrated in the graphs 200 and 300.

TABLE 1

System Parameter Configuration

| | BS height | Carrier frequency | ISD | UE height | UE distribution | UE mobility | Min UE-eNB distance |
|---|---|---|---|---|---|---|---|
| UMa | 25 m | 2 GHz | 500 m | 1 m | Uniform | 3 km/h | 35 m |
| UMi | 10 m | 2 GHz | 200 m | 1 m | Uniform | 3 km/h | 10 |

As illustrated in FIGS. 2 and 3 there is a fairly good probability of having a LOS radio channel when the UE is close to the access node. Unfortunately, Clarke's model does not yield as accurate an approximation of coherence time in LOS radio channels as may be available through other coherence time modeling techniques, and therefore may not be appropriate for approximating coherence time in next generation beam-centric wireless communication systems.

Using CQI measurements for approximating coherence time can be effective for highly scattered Rayleigh fading channels, where the LOS probability is rare. The CQI index is a one dimensional reflection of signal power in the form of SNR and neglects the phase information. Therefore it is fundamentally difficult to estimate the actual coherence time for beam channels using CQI.

Various alternatives to the Clarke's model, eq. 1, are available for approximating coherence times for radio channels with differing characteristics. For example, coherence time for radio channels with a LOS condition can be modeled using an LOS coherence time model, also referred to herein as an LOS model, as shown in equation 2:

$$T_c = \frac{D_\lambda}{f_d \sin(\alpha_{los})} \cos^{-1}(2\theta^2 \log R + 1) \qquad \text{eq. 2}$$

where the quantity $$D_\lambda = \frac{D}{\lambda},$$

and D is the transmit-receive distance, $\lambda$ is the carrier wavelength, $\alpha_{los}$ is the direction toward the transmitter, $\theta$ is the beam width, and R is the channel correlation.

For radio channels experiencing a non-line of sight (NLOS) condition, the coherence time associated with the dominant NLOS path, which is usually caused by strong reflections, can, when the pointing error is small, be modeled with a NLOS small pointing error model as shown in equation 3:

$$T_c = \frac{1}{f_d} \sqrt{\frac{1/R^{4-1}}{(2\pi)^2 \theta^4 + \frac{1}{2\theta^4 R^4}\left(\frac{\sin\mu_r}{D_{r,\lambda}}\right)^2}} \qquad \text{eq. 3}$$

where the quantity $$D_{r,\lambda} = \frac{D_r}{\lambda}$$

is the scatter-receive $D_r$ normalized by the carrier wavelength $\lambda$, and $\mu_r$ is the pointing direction.

When an NLOS radio channel with a dominant path has large pointing error, the coherence time can be approximated using a NLOS large pointing error model as shown in equation 4:

$$T_c = \sqrt{\frac{1 - (1 + \theta^4 \log R)^2}{\frac{1}{4}(1 + \theta^2 \log R)\left(\frac{f_d \sin\mu_r}{D_{r,\lambda}}\right)^2 (2\pi f_d)^2 \theta^4}} \qquad \text{eq. 4}$$

Figure 4:
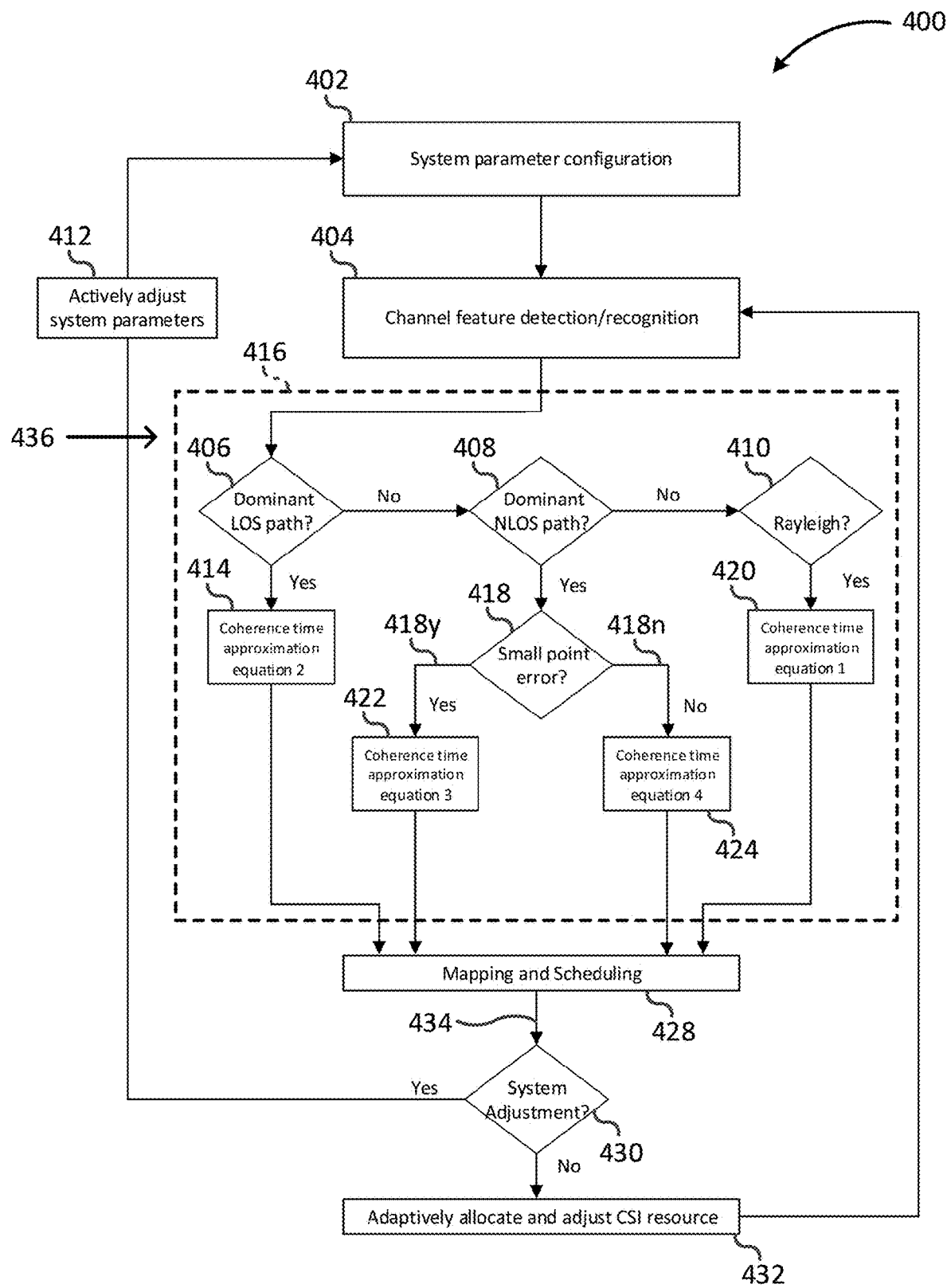
FIG. 4 illustrates a flow diagram of an exemplary method for adjusting CSI resource configurations based on coherence time approximations incorporating aspects of the disclosed embodiments.

Referring now to FIG. 4 there can be seen an exemplary embodiment of a method 400 for actively adjusting CSI resource configurations and actively adjusting system settings in a wireless communication system. Conventional wireless systems typically fix the CSI resource configurations and system settings when a UE connects. In contrast, the exemplary method 400 continually and repeatedly adjusts the CSI resource allocations and system settings to enhance communications between an access node and the UE it is serving. The illustrated embodiment advantageously adjusts CSI resource configurations to enhance communication with UE being served and/or to increase the number of UEs being served. The illustrated embodiment is further configured to actively adjust system settings such that further differentiation among the radio channels is achieved thereby enhancing benefits provided through active allocation of the CSI resources. The exemplary embodiment illustrates the use of DCTA as the DCCA, however those skilled in the art will readily recognize that any suitable metric or measure may be advantageously employed as a DCCA.

The method 400 begins with an initial set of system settings 402 which are used to establish a radio link between an access node and one or more user equipment being served by the access node. Next channel features are recognized 404 and/or detected based on information gathered about each radio link being maintained by an access node. In certain embodiments recognition/detection 404 of the channel features may be performed by other processes or methods and be received by the method 400.

Channel features may be any useful value associated with a radio link including known values such as system parameters or settings etc., measured values such as SNR, etc., or derived or determined values such as UE speed, direction, or distance, etc.

The linear mobility of a UE and/or its position may be estimated from measurements such as round trip time (RTT), time of arrival (TOA), time difference of arrival (TDOA), angle of arrival (AoA), received signal strength indication (RSSI), and/or global position system (GPS). Angular mobility may be estimated based on the AoA/DOA, CDI, the change of beam phase, as well as other measured or detected values.

The accuracy of any mobility estimations is not important to the operation of the method 400. A UE may be categorized into different mobility levels where the range between each mobility level is large enough to tolerate the presence of positioning error. For example, a UE may be categorized into two linear mobility levels, a high level (such as above 15 kilometers per hour) and low level (such as below 15 kilometers per hour). Angular mobility may be similarly categorized as high level (such as above 10 degrees) and a low level (such as below 10 degrees).

Pointing direction may be directly obtained from the CDI and/or AoA and direction of arrival (DoA) measurements. The CDI is used in LTE wireless communication systems, and especially in LIE-A systems, for providing quantized information about the favored beamforming direction. The AoA/DoA is one of the defined measurements required by wireless communication system standards such as the 3GPP LIE standards.

In a NLOS beam channels, there is pointing error between the UE and the reflected beams due to mobility of the UE. When the UE moves in a linear and/or an angular direction, the set of scatters seen at the UE will be different if the beam is not adaptive. This effect is referred to as pointing error. The UE can be correspondingly inferred as large pointing error if at least one of the linear or angular levels is high. Otherwise a small pointing error may be assigned.

When there are no dominant LOS or NLOS paths, the channel condition can be recognized as having a Rayleigh condition.

The above discussed channel features may be detected from system settings, measurements, and/or obtained from other channel features as summarized in Table 2.

TABLE 2

The Relation between Channel Condition and feature

| | Conditions | | | | | |
|---|---|---|---|---|---|---|
| | LOS | Linear mobility | Angular rotation | Pointing direction | Pointing error | Rayleigh |
| Measurements or features | Angle spread, delay spread, RSRP, RSSI, CQI, etc. | RTT, TOA, TDOA, AOA, RSSI, GPS, etc. | AOA, DOA, beam phase, linear mobility, etc. | CDI, AOA, DOA, linear mobility, etc. | AOA, DOA, beam phase, linear mobility, angular rotation, etc. | Angle spread, delay spread, RSRP, RSSI, CQI, etc. |

The channel features 404 are used to determine 416 a DCTA based on the coherence time models described above. LOS/NLOS, dominant path, and pointing error are determined 436 to distinguish the radio channel, then a series of decisions 406, 408, 410, 418 are used to select an appropriate coherence time model such as for example from the above described coherence time approximations shown in eq. 1, eq. 2, eq. 3, and eq. 4.

When the radio channel is LOS 406, then an LOS coherence time model, eq. 2, is used to determine 414 a DCTA. When the radio channel is NLOS with a dominant path 408 and the pointing error is small 418y, a small pointing error coherence time model, eq. 3, is used to determine 422 the DCTA. When the radio channel is NLOS with a dominant path 408 and the pointing error is not small 418n, then a large pointing error coherence time model, eq. 4, is used to determine 424 the DCTA. When the radio channel is NLOS and has no dominant path, the radio channel is treated as Rayleigh fading 410 and Clarke's coherence time model, eq. 1, may be used to determine 420 a DCTA for the radio channel.

Any or all of the determined coherence times 414, 422, 424, may then be used in a mapping and scheduling procedure 428 to determine a desired CSI resource configuration 434. Determination of a desired CSI resource configuration 434 may be done with any suitable mapping and scheduling 428 procedure or algorithms. The scheduling criterions can be pre-developed according to specific system design requirements and may include for example CSI event reduction, maximizing system throughput, maximizing the number of UE being served by an access node, maximizing reliability, balancing system load, etc. A scheduler may have several scheduling criterions that can be applied according to different system requirements and these scheduling criterions may be selected or modified as system requirements or conditions change.

An exemplary embodiment of suitable mapping and scheduling 428 appropriate for use with a DCTA is illustrated below. The illustrated embodiment is presented as an aide to understanding and those skilled in the art will readily recognize that any suitable mapping and scheduling may be employed without straying from the spirit and scope of the disclosed embodiments. In the illustrated embodiment the system is configured to use periodic CSI, such as periodic CSI reports and/or periodic SRS, and the mapping and scheduling 428 selects an appropriate CSI period based on the coherence time approximations for each channel. As used herein the term CSI period refers to a period used for any periodic CSI resources, such as for example, the CSI reporting period associated with periodic CSI reports and the SRS transmission period associated with periodic SRS transmission.

When the system budget includes sufficient CSI resources to support all UE being served by an access node, a first scheduling approach may be used as illustrated in eq. 5 below. A desired CSI period may be determined by selecting the largest CSI period supported by the system that is smaller than the coherence time of the radio channel. This CSI period selection can be expressed for the $k^{th}$ UE in a set of UE being serviced by an access node as shown in equation 5:

$$T_{csi,k} = \min_j \arg\left(\frac{|T_{c,k}|}{T_{p,j}} - 1\right) \text{ with } \frac{|T_{c,k}|}{T_{p,j}} - 1 > 0 \qquad \text{Eq. 5}$$

where $T_{csi,k}$ is the desired CSI period to be allocated for the $k^{th}$ UE, $T_{c,k}$ is the approximated coherence time determined 416 for the $k^{th}$ UE, $T_{p,j}$ is the $j^{th}$ supported CSI period in the set of CSI periods supported by the system, and $\lfloor \cdot \rfloor$ is the floor operator. In certain wireless communication systems the CSI period for transmission of periodic SRS can be as small as 2 milliseconds or as large as once every 160 milliseconds.

When the system does not have enough CSI resources available to meet the requirements of all UE being serviced by an access node, an alternative approach for scheduling CSI resource configurations may be used. A scheduling offset $\Delta T_k$ may be calculated for each UE as:

$$\Delta T_k = \lfloor T_{c,k} \rfloor - T'_{csi,k} \text{ for } k=1, \ldots, K \qquad \text{Eq. 6}$$

where K is the total number of UE being serviced by the access node, and the scheduling offset $\Delta T_k$ represents the difference between the coherence time approximation for the $k^{th}$ UE $T_{c,k}$ and the currently allocated CSI period $T'_{csi,k}$ for the $k^{th}$ UE. A UE having a positive scheduling offset $\Delta T_k$ has an approximated coherence time $T_{c,k}$ that is greater than the current CSI reporting period $T'_{csi,k}$. A positive scheduling offset $\Delta T_k$ provides an opportunity to recover CSI resources by increasing the CSI period. Conversely, a UE having a negative scheduling offset $\Delta T_k$ has an approximated coherence time $T_{c,k}$ that is smaller than the current CSI reporting period $T'_{csi,k}$. A UE with negative scheduling offset $\Delta T_k$ will require additional CSI resources to maintain efficient radio communications.

In one embodiment the mapping and scheduling 428 can begin by recovering CSI resources from UE that are currently allocated more CSI resources than needed as may be indicated by a positive scheduling offset $\Delta T_k$. UE having a positive scheduling offset $\Delta T_k$ can be sorted in descending order:

$$SP_{increase} = \text{sort}(\Delta T_k, \text{descending}) \text{ for } k=1, \ldots, M, \qquad \text{Eq. 7}$$

where M is the number of UE with positive scheduling offset $\Delta T_k$, M≤K, and K is the number of UEs being served by the access node. The scheduling priority $SP_{increase}$ for increasing the CSI period is based on the sorting order obtained from eq. 7.

Next the mapping and scheduling 428 may be configured to allocate additional CSI resources to UE that have a negative scheduling offset $\Delta T_k$. UE with negative scheduling offset $\Delta T_k$ are given a scheduling priority as shown by the following equation:

$$SP_{decrease} = \text{sort}(-\Delta T_k, \text{descending}) \text{ for } k=1, \ldots, N, \qquad \text{Eq. 8}$$

where N is the number of UE having a negative scheduling offset $\Delta T_k$, and N≤K. Then a scheduling priority for decreasing the CSI period $SP_{decrease}$ is performed in the descending order as shown in eq. 8.

The desired CSI period, or desired CSI resource configuration, is used to adaptively allocate and adjust the CSI resources 432 for each UE. The scheduling offset $\Delta T_k$ can be used for triggering the CSI reconfiguration 432 as desired. For example, the scheduling offset $\Delta T_k$ may be compared to a pre-determined time difference and configured to trigger CSI adjustment 432 when the pre-determined time difference or threshold value is exceeded. Alternatively a pre-determined ratio or percentage may be used as a threshold value to trigger CSI adjustment 432. When CSI adjustment 432 is triggered, the obtained scheduling priorities $SP_{increase}$, $SP_{decrease}$ and/or the scheduling offsets $\Delta T_k$ may be used to adaptively update the CSI resource configurations 432. In certain embodiments it may be desirable to adapt the threshold value based on current and/or past conditions of the wireless system.

In certain embodiments it may be desirable to actively adjust the system settings 412 such that a desired DCTA is obtained for some or all of the UE being served. Information 436 determined to differentiate the radio channels as well as information derived during mapping and scheduling 428 can be used to determine 430 when adjustment of the system settings may be advantageous. The system settings may then be adjusted 412 as desired. For example, information 436 obtained while determining coherence time 416 may be used to guide adjustment 412 of the system settings such that CSI resources may be shifted from one UE to another.

At times and under the right conditions adjustment of the system settings may be employed as an alternative to adjusting the CSI resource configurations. Based on the obtained scheduling priorities $SP_{increase}$, $SP_{decrease}$ and/or the scheduling offsets $\Delta T_k$, equivalent actions can be effectively implemented by adjusting 412 the system settings to allocate or adjust resources such as resource blocks (RBs), or by implementing UE pairing.

Figure 5:
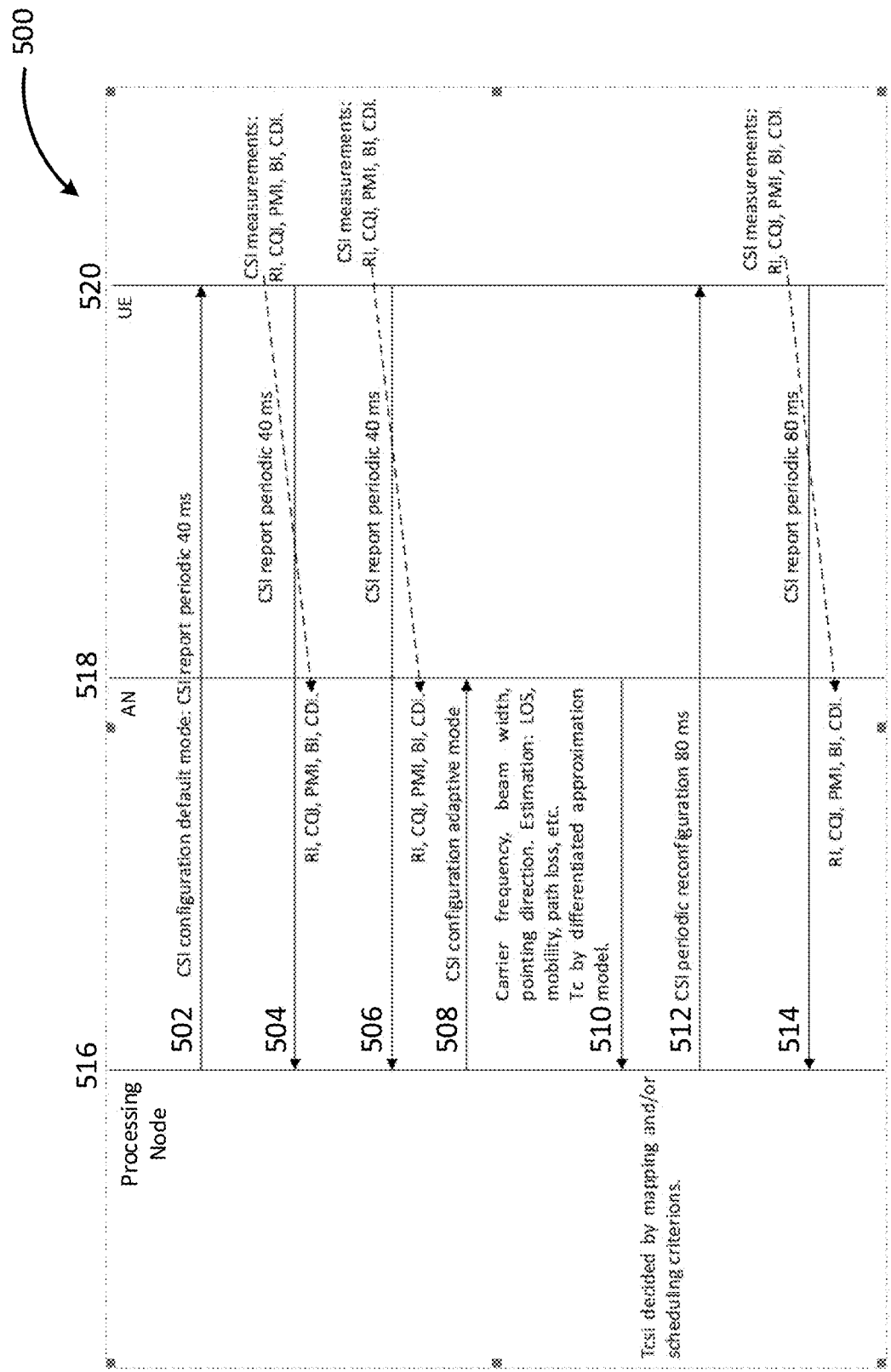
FIG. 5 illustrates a message flow diagram of an exemplary method for updating CSI configurations incorporating aspects of the disclosed embodiments.
Figure 6:
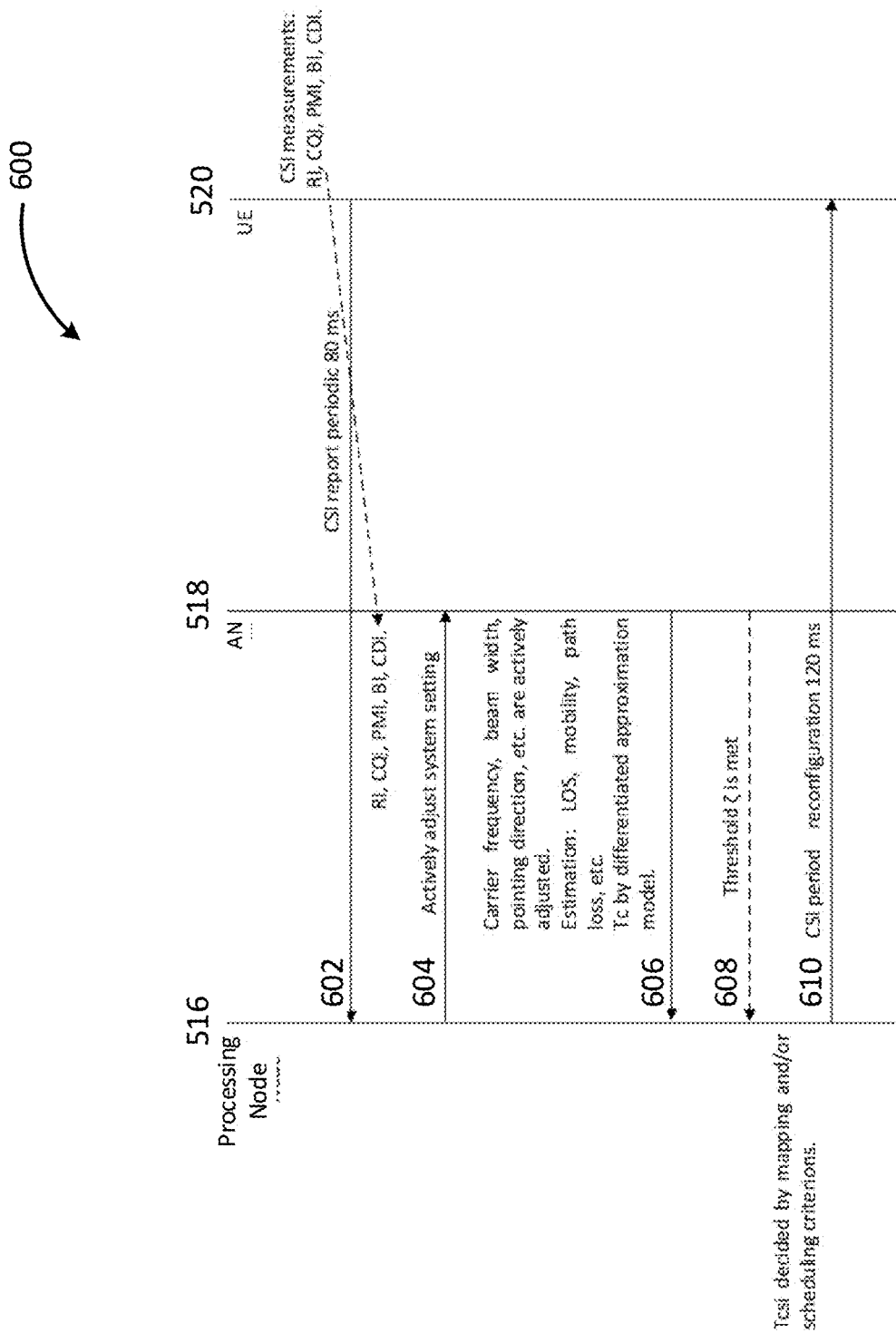
FIG. 6 illustrates a message flow diagram of an exemplary method for updating system settings incorporating aspects of the disclosed embodiments.

FIG. 5 and FIG. 6 illustrate signaling flow diagrams showing exemplary signaling between processing node 516, AN 518, and UE 520. In FIG. 5 and FIG. 6 the processing node 516 is depicted as a vertical line, the AN 518 is depicted as a vertical line, and the UE 520 is depicted as a vertical line. Messages passed between the processing node 516, the AN 518, and the UE 520 are depicted by horizontal arrows such as the horizontal arrow 502 which illustrates a message being sent from the processing node 516 to the UE 520. Time increases downward such that messages shown toward the top occur before messages shown toward the bottom. FIG. 5 and FIG. 6 depict the processing node 516 and the AN 518 as separate entities, however the disclosed embodiments are not so constrained and may have the functionality of both the processing node 516 and AN 518 performed by a single processing node or distributed among several processing nodes as desired.

Referring now to the message flow 500 illustrated in FIG. 5, the first three messages 502, 504, and 506 illustrate messages used in conventional wireless communication systems. A processing node 516 or access node 518 sends a default CSI resource configuration message 502 to the UE 520. For example this default CSI resource configuration may indicate a periodic CSI report with a fixed CSI period of 40 milliseconds. The UE 520 then begins sending periodic CSI messages or reports 504, 506 back to the AN 518 and/or a processing node 516, such as a scheduling node. These periodic CSI reports 504, 506 may include measurements or derived values such as a rank indication (RI), a channel quality index (CQI), a pre-coding matrix indicator (PMI), beam index (BI), channel direction indicator (CDI), etc. This fixed approach to configuring CSI resources can result in UE 520, that have relatively stable or unvarying radio channels, sending more CSI reports than is necessary thereby wasting CSI resources, leaving other UE 520 that may have rapidly varying radio channels starving for CSI resources.

The problem of over-allocating CSI resources to some UE while under allocating or starving other UE may be alleviated by switching to an adaptive CSI configuration mode 508. Once the adaptive mode 508 is enabled, information about the radio channel is obtained by the AN 518 or other network node and sent 510 to the processing node 516. Channel information may include values such as carrier frequency, beam width, pointing direction, etc. In certain embodiments the channel information may also include estimated or derived information such as LOS condition, UE mobility, path loss, etc., or alternatively the processing node 516 may derive this information. The processing node 516 may use the channel information to determine a DCCA, such as for example a DCTA based on various coherence time models such as the coherence time models shown in eq. 1 through eq. 4 above.

The processing node 516 may then direct 512 the UE 520 to adjust the CSI resource configuration or the CSI period. For example the default CSI reporting period of 40 milliseconds may be lengthened to about 80 milliseconds. The UE 520 then begins sending CSI reports 514 at the adjusted CSI period. Adaptively adjusting CSI resource configurations based on DCCA provides flexible CSI resource usage allowing for improved servicing of UE 520 by an AN 518.

FIG. 6 illustrates a continuation signaling flow 600 that may follow the exemplary signaling flow 500 illustrated in FIG. 5 and described above. The UE 520 continues to send 602 periodic CSI reports at the adjusted CSI period which was changed when the AN 518 sent a message 512 to the UE 520.

Alternatively, or in addition to adjusting 512 the CSI resource configuration, the processing node 516 may actively adjust system settings 604 in a way that aids or improves CSI resource usage. Active adjustment of the system settings 604 is illustrated in the signal flow 600. The AN 518 provides 606 channel information such as carrier frequency, beam width, pointing direction, etc. and estimations of distinguishing channel conditions such as LOS condition, mobility, path loss etc. Alternatively, certain channel information may be derived within the processing node 516 coupled to the wireless communication network.

In one embodiment, a threshold value may be introduced to trigger 608 reconfiguration 610 of the CSI resources or adjustment of the CSI period. The threshold value may be pre-determined or adaptively adjusted based on channel information, and may be a specific time value, a ratio, or other type of threshold value used to trigger CSI resource configuration. For example, the threshold value may be a ratio such as the absolute value of the scheduling offset divided by the current CSI period $$\frac{|\Delta T_k|}{T_{csi}^t}.$$

When triggered, an updated CSI resource reconfiguration is sent 610 to the UE 520 whereupon the UE 520 will adjust its CSI resource configuration, such as a CSI period, to a new value. For example the CSI period may be increased 610 to about 120 ms.

Figure 7:
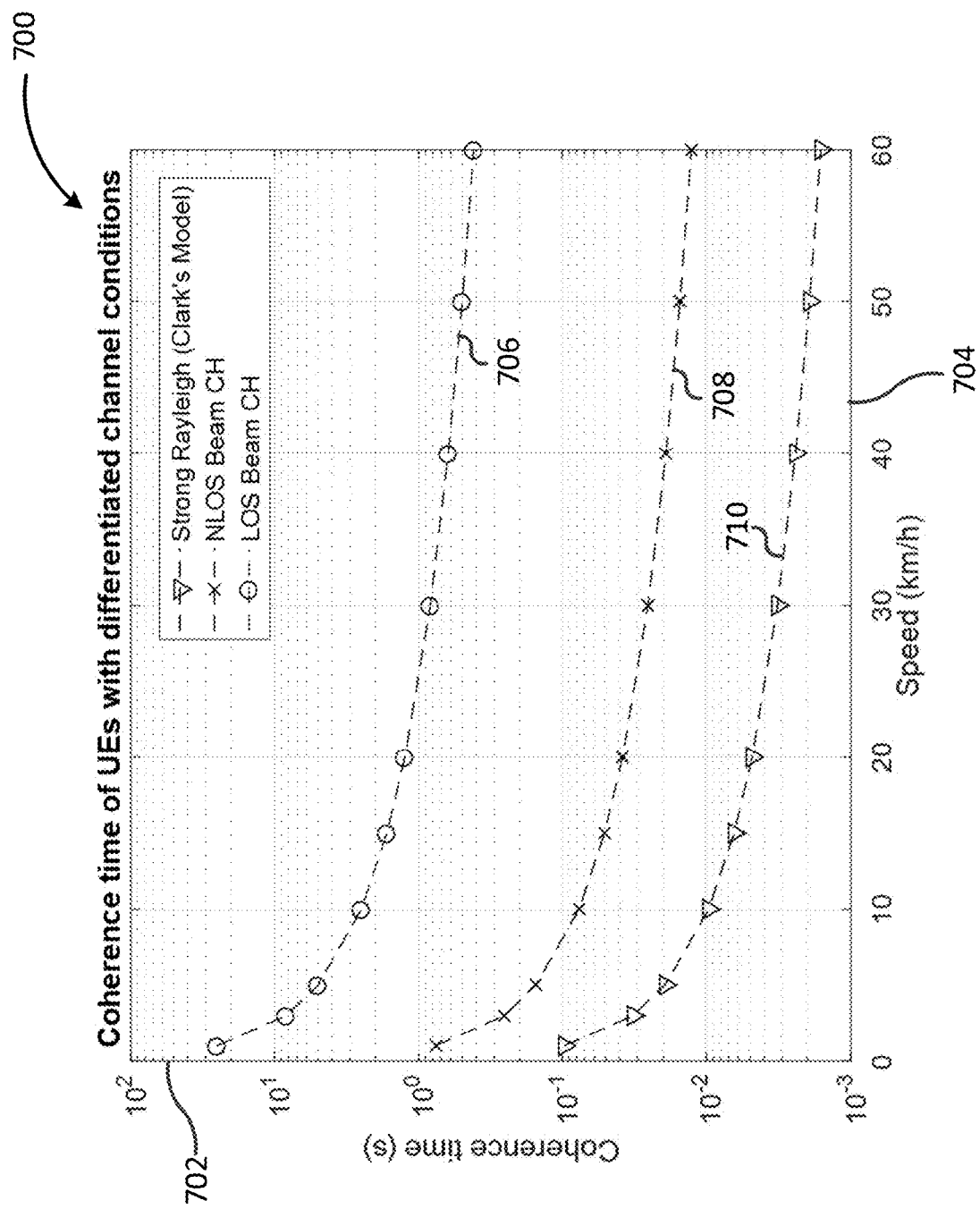
FIG. 7 illustrates a graph of coherence times in a wireless communications network incorporating aspects of the disclosed embodiments.

FIG. 7 illustrates a graph 700 showing coherence time approximations for changing radio channel conditions. Coherence time is depicted in seconds, increasing upwards, along a vertical axis 702. UE speed in kilometers per hour is depicted increasing to the right along a horizontal axis 704. Coherence time versus UE speed for a strong Rayleigh channel as approximated using Clarke's model, eq. 1, is shown in the bottom graph 710. Coherence time versus UE speed for a NLOS beam channel as approximated using the coherence time models shown in eq. 3 and eq. 4 is shown in the middle graph 708. Coherence time versus UE speed for a LOS channel as approximated using the coherence time model of eq. 2 is shown in the top graph 706. The graphs 700 illustrate how selecting an appropriate coherence time model can provide significantly differentiated coherence time approximations. For example the coherence time of a Rayleigh channel 710 can be nearly 200 times shorter than the coherence time of a LOS channel 706.

Figure 8:
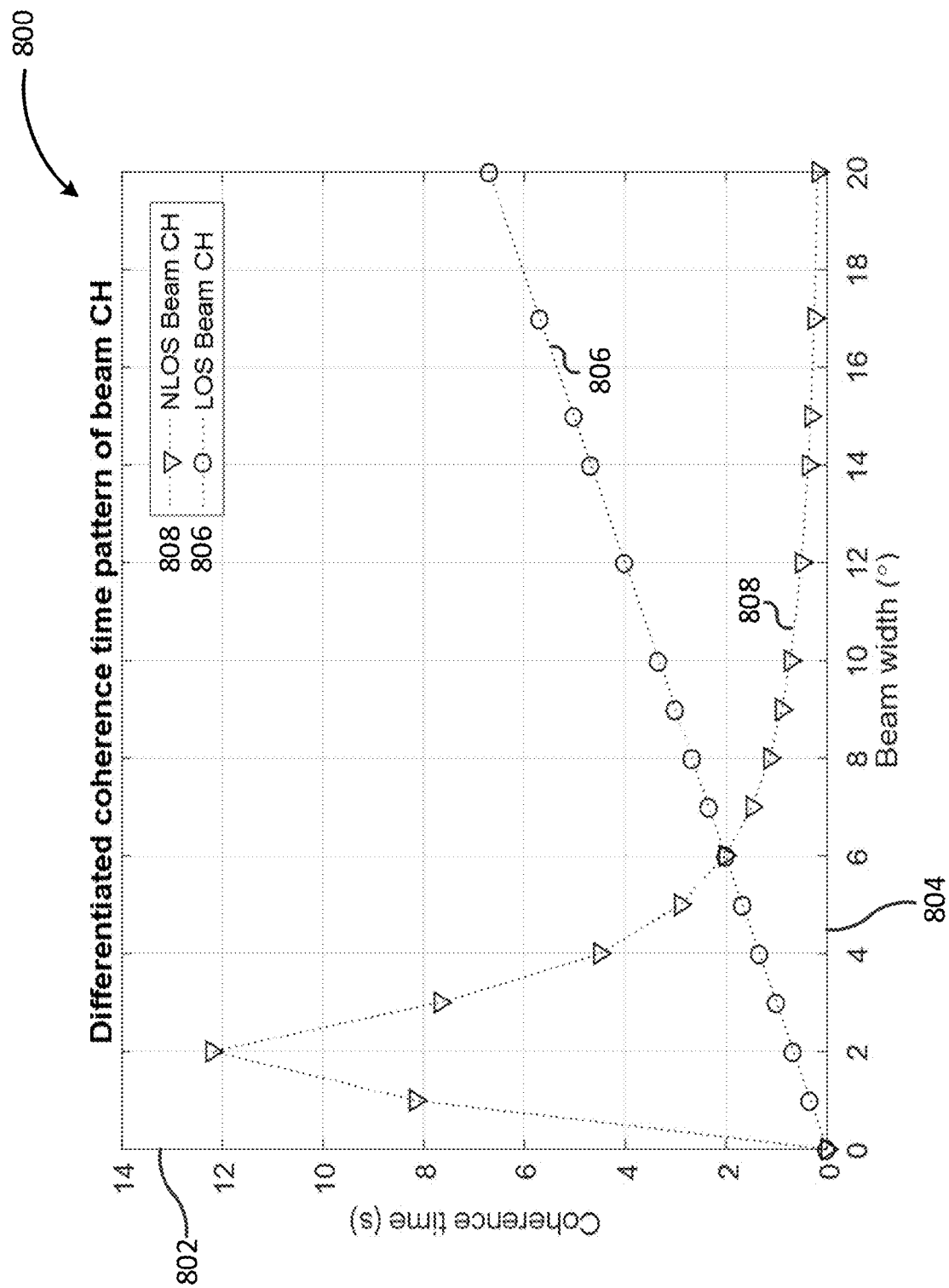
FIG. 8 illustrates a graph of differentiated coherence time patterns in a wireless communications network incorporating aspects of the disclosed embodiments.

FIG. 8 illustrates a graph 800 showing how coherence time of a radio channel changes as a function of beam width. Coherence time is depicted in seconds increasing upwards along a vertical axis 802 and beam width is depicted in degrees along a horizontal axis 804 with beam width increasing toward the right. Coherence time for a LOS beam channel is illustrated by graph 806, and a coherence time for a NLOS beam channel is illustrate by graph 808.

A LOS beam channel 806 and a NLOS beam channel 808 have nearly the same coherence time (about 2 seconds) when the beam width is about 6 degrees. Reducing the beam width to about 2 degrees for the NLOS beam channel 808 can double the coherence to about 12 seconds. In contrast, reducing the beam width of a LOS beam channel 806 causes a reduction in the associated coherence time. Graph 800 illustrates how changing system settings, such as beam width, can change conditions of a radio channel in predictable ways, such as changing the coherence time of the radio channel. For example reducing the beam width of a NLOS channel can lengthen the coherence time of that channel thereby freeing up CSI resources for use by a channel having a short coherence time. Thus actively changing systems settings can be employed to create differentiation among UE and to improve use of available CSI resources.

FIG. 9 illustrates a block diagram of an exemplary processing node 900 appropriate for implementing embodiments of the present disclosure. The illustrated processing node 900 includes a processor 902 coupled to a computer memory 904, a network interface 906, and optionally a user interface (UI) 908. The processing node 900 may be incorporated in or coupled to a wireless communication system and is appropriate for implementing any of the methods and processes described herein. The processing node 900 may be implemented as a separate processing entity, or may when desired be incorporated into an access node, UE or other entity in a wireless communication system.

The processor 902 may be a single processing device or may comprise a plurality of processing devices including special purpose devices, such as for example, digital signal processing (DSP) devices, microprocessors, and general purpose computer processors. The processor 902 may be configured to implement embodiments of the methods and apparatus for adjusting CSI resource configurations and/or system settings described herein. In certain embodiments the processor may include a CPU working in tandem with a graphics processing unit (GPU) and may include specialized DSP hardware firmware and software to handle signal processing tasks. The processor 902 may also include one or more processing cores configured for parallel processing.

The processor 902 is coupled or connected to a memory 904 which may be a combination of various types of volatile and non-volatile computer memory such as for example read only memory (ROM), random access memory (RANI), magnetic or optical disk, or other types of computer accessible memory. The memory 904 stores computer program instructions that may be accessed and executed by the processor 902 to cause the processor to perform a variety of desirable computer implemented processes or methods such as embodiments of methods for detection of channel features, adjustment of CSI resource configurations, and/or active adjustment of system settings.

The program instructions stored in memory 904 may be organized as sets or groups of program instructions often referred to in the software industry with various terms such as programs, software components, software modules, units, etc. Each module may include a set of functionality designed to support a certain purpose. For example a software module may be of a recognized type such as an operating system, an application, a device driver, or other conventionally recognized type of software component. Also included in the memory 904 are program data and data files which may be stored and processed by the processor 902 while executing a set of computer program instructions. Various portions of the program instructions may be distributed among a plurality of processing devices or processors that work together to carry out the desired methods or processes.

In certain embodiments, the processing node 900 includes a network interface 906 coupled to the processor 902 and configured to communicate with other entities in a wireless communications network 800. The network interface 906 may be of a standardized type, such as Ethernet and/or WiFi, or may be specific to a particular network implementation. In certain embodiments the network interface may include a radio frequency unit capable of communicating over a wireless communication network. Alternatively, the network interface 906 may be coupled to a wired to other physical computer communication network.

The UI 908 may include one or more user interface elements such as a touch screen, keypad, buttons, voice command processor, as well as other elements adapted for exchanging information with a user. The UI 908 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps. Alternatively, the computing apparatus may not include a UI 908 such as when the processing node 900 is configured to be controlled and administered remotely via the network interface 906.

In certain embodiments, the processing node may be coupled to an antenna array 914 or other device capable of transmitting and receiving radio signals, such as when the processing node 900 is incorporated into an access node.

FIG. 10 illustrates a block diagram of an exemplary wireless communication network 1000 that may advantageously employ the methods and apparatus disclosed herein. The wireless communication network 1000 includes three cells 1010, 1016, 1022 with each cell having an access node 1012, 1018, 1024 configured to service one or more UE 1014, 1020, 1026, 1028, 1030. The wireless communication network 1000 may include more or less than three cells, and each cell may include more than one access node, and service any number of zero or more UE. An access node 1018 is configured to communicate with one or more UE 1020, 1028, 1030 over respective radio links 1032, 1034, 1036.

A processing node 1050 is coupled to the access node 1018 and may be configured to adjust CSI resource configurations and/or system settings associated with each radio link 1032, 1034, 1036 in accordance with any of the methods disclosed herein. The processing node 1050 may be configured as a separate processing node 1050 coupled to one or more access nodes 1012, 1018, 1024. Alternatively the processing node 1050 may be incorporated within an access node 1018, or distributed among other processing devices within the wireless communications network 1000.

In certain embodiments, the processing node 1050, may be incorporated within a UE 1014, 1020, 1026, 1028, 1030. When incorporated into a UE 1020, 1028, 1030, the processing node 1050 may be configured adjust the CSI resource configuration by sending a desired CSI resource configuration to the serving access node 1018 whereupon receiving the desired CSI resource configuration, the serving access node 1018 will coordinate the desired adjustment.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A processing node, comprising at least one processor and a memory coupled to the at least one processor, the at least one processor being configured to:
receive one or more channel features, which are associated with a radio channel corresponding to a radio link connecting an access node and a user equipment;
determine one or more distinguishing channel conditions based on the received one or more channel features;

determine and allocate a desired channel state information (CSI) resource configuration based on the one or more distinguishing channel conditions;

adjust a current CSI resource configuration associated with the radio channel, based on the determined desired CSI resource configuration, and wherein the at least one processor is configured to determine the desired CSI resource configuration by implementing the following:

selecting a differentiated coherence time model from a plurality of differentiated coherence time models, which comprise one or more of a Clarke's model, a line of sight (LOS) model, a non-line of sight (NLOS) small pointing error model, and a NLOS large pointing error model;

computing a differentiated coherence time approximation based on the selected differentiated coherence time model; and determining the desired CSI resource configuration based on the determined differentiated coherence time approximation.

2. The processing node of claim 1, wherein the at least one processor is further configured to actively adjust a system setting based on one or more of: the one or more channel features; the one or more distinguishing channel conditions; the desired CSI resource configuration; a desired channel condition; and an available CSI resource pool.

3. The processing node of claim 1, wherein the at least one processor is configured to:

determine a differentiated channel condition approximation based on the one or more channel features and the one or more differentiating channel conditions; and determine the desired CSI resource configuration based on a mapping of the one or more differentiating channel condition approximations to the desired CSI resource configuration.

4. The processing node according to claim 1, wherein the at least one processor is configured to select the LOS model as the differentiated coherence time model, wherein the radio channel is determined to be in a LOS condition, wherein the radio channel is determined to be in a dominant NLOS condition with large pointing error.

5. The processing node according to claim 1, wherein the at least one processor is configured to select the NLOS small pointing error model as the differentiated coherence time model, wherein the radio channel is determined to be in a dominant NLOS condition with small pointing error.

6. The processing node according to claim 1, wherein the at least one processor is configured to select the NLOS large pointing error model as the differentiated coherence time model.

7. The processing node according to claim 1, wherein the at least one processor is configured to select the differentiated coherence time model as a statistical data based model, and to compute the differentiated coherence time approximation based on the statistical data based model.

8. The processing node according to claim 7, wherein the at least one processor is configured to update the statistical data based model based on historical data.

9. The processing node according to claim 1, wherein the desired CSI resource configuration comprises one or more of a desired CSI period, a desired number of resource blocks, a desired position of resource blocks, a desired type of combs, and a desired phase rotation, and the current CSI resource configuration comprises a corresponding one or more of a current CSI period, a current number of resource blocks, a current position of resource blocks, a current type of combs, and a current phase rotation;

wherein the at least one processor is configured to:

determining that a difference between the desired CSI resource configuration and the current CSI resource configuration exceeds a threshold value; and in accordance with determining that the difference exceeds the threshold value, adjusting the current CSI resource configuration.

10. The processing node according to claim 1, wherein the one or more distinguishing channel conditions comprise a plurality of distinguishing channel conditions, which are associated with a plurality of radio channels, wherein each radio channel in the plurality of radio channels corresponds to a radio link connecting the access node to one user equipment in a plurality of user equipment, wherein the at least one processor is configured to:

select, for each radio channel in the plurality of radio channels, a differentiated coherence time model from the plurality of coherence time models based on the distinguishing channel conditions associated with the each radio channel;

determine a differentiated coherence time approximation for each radio channel in the plurality of radio channels based on the corresponding selected coherence time model and the associated distinguishing channel conditions;

determine, for each radio channel in the plurality of radio channels, a desired CSI configuration based on the determined differentiated coherence time approximations and/or a current CSI allocation; and adjust one or more current CSI resource configurations based on the corresponding determined desired CSI resource allocation, wherein each radio channel in the plurality of radio channels is associated with one of the one or more current CSI resource configurations.

11. The processing node according to claim 10, wherein the processing node is coupled to a wireless communications network comprising a set of available CSI resource configurations, and the at least one processor is configured to implement one of the following (a) and (b):

(a) determining that the wireless communications network comprises sufficient CSI resources to satisfy all the desired CSI resource configurations, in accordance with the determining that the wireless communications network comprises the sufficient CSI resources, assigning, for each radio channel in the plurality of radio channels, a new CSI resource configuration from the set of available CSI resource configurations; and (b) determining that the wireless communications network comprises insufficient CSI resources to satisfy all the desired CSI resource configurations, in accordance with the determining that the wireless communications network comprises the insufficient CSI resources, recovering, extra CSI resources by reducing an amount of CSI resources which is being used by radio channels and is having more CSI resources than required by the corresponding desired CSI resource configuration; and allocating the recovered extra CSI resources to radio channels having fewer CSI resources than required by the corresponding desired CSI resource configuration.

12. A method, applied to a processing node comprising at least one processor, the method comprising:

receiving one or more channel features, which are associated with a radio channel corresponding to a radio link connecting an access node and a user equipment;

determining one or more distinguishing channel conditions based on the received one or more channel features;

determining a desired channel state information (CSI) resource configuration based on the one or more distinguishing channel conditions;

adjusting a current CSI resource configuration associated with the radio channel, based on the determined desired CSI resource configuration;

wherein the desired CSI resource configuration is determined by implementing the following:

selecting a differentiated coherence time model from a plurality of differentiated coherence time models, which comprise one or more of a Clarke's model, a line of sight (LOS) model, a non-line of sight (NLOS) small pointing error model, and a NLOS large pointing error model;

determining a differentiated coherence time approximation based on the selected differentiated coherence time model; and determining the desired CSI resource configuration based on the determined differentiated coherence time approximation.

13. The method according to claim 12, further comprising: adjusting a system settings based on one or more of the desired CSI resource configuration and a desired channel condition, wherein the system settings comprise one or more of a carrier frequency, beam width, beam phase, beam pointing direction, and transmit power.

14. The method according to claim 12, further comprising: actively adjusting a system setting based on one or more of: the one or more channel features; the one or more distinguishing channel conditions; the desired CSI resource configuration; a desired channel condition; and an available CSI resource pool.

15. The method according to claim 12, further comprising:

determining a differentiated channel condition approximation based on the one or more channel features and the one or more differentiating channel conditions; and determining the desired CSI resource configuration based on a mapping of the one or more differentiating channel condition approximations to the desired CSI resource configuration.

16. The method according to claim 12, further comprising:

selecting, the LOS model as the differentiated coherence time model, wherein the radio channel is determined to be in a LOS condition.

17. The method according to claim 12, further comprising:

selecting, a the NLOS small pointing error model as the differentiated coherence time model, wherein the radio channel is determined to be in a dominant NLOS condition with small pointing error.

18. A non-transitory computer-readable medium, comprising instructions to be executed by a processor, wherein the instructions cause the processor to perform a method comprising:

receiving one or more channel features, which are associated with a radio channel corresponding to a radio link connecting an access node and a user equipment;

determining one or more distinguishing channel conditions based on the received one or more channel features;

determining a desired channel state information (CSI) resource configuration based on the one or more distinguishing channel conditions;

adjusting a current CSI resource configuration associated with the radio channel, based on the determined desired CSI resource configuration; and wherein the desired CSI resource configuration is determined by implementing the following:

selecting a differentiated coherence time model from a plurality of differentiated coherence time models, which comprise one or more of a Clarke's model, a line of sight (LOS) model, a non-line of sight (NLOS) small pointing error model, and a NLOS large pointing error model;

computing a differentiated coherence time approximation based on the selected differentiated coherence time model; and determining the desired CSI resource configuration based on the determined differentiated coherence time approximation.

* * * * *